United States Patent [19]

Cooke et al.

[11] Patent Number: 4,673,545

[45] Date of Patent: Jun. 16, 1987

[54] REMOTELY CONTROLLED APPARATUS FOR REMOVING CLIPS FROM IRRADIATED NUCLEAR FUEL ASSEMBLIES

[75] Inventors: William R. Cooke, Spokane; Brian G. Haugen, Richland; Adolfo Reparaz, Kennewick, all of Wash.

[73] Assignee: Advanced Nuclear Fuels Corporation, Florham Park, N.J.

[21] Appl. No.: 668,635

[22] Filed: Nov. 6, 1984

[51] Int. Cl.$^4$ .................. G21C 19/00; G21C 19/32
[52] U.S. Cl. ..................... 376/261; 376/248; 376/272; 294/95; 294/116; 294/906; 29/720; 29/723; 29/243.56; 414/146
[58] Field of Search ............... 376/260, 261, 264, 271, 376/248, 272; 294/906, 95, 96, 116; 29/723, 720, 243.56; 414/146, 589, 590; 252/626

[56] References Cited

U.S. PATENT DOCUMENTS

| | | | |
|---|---|---|---|
| 3,390,053 | 6/1968 | Tarasuk et al. | 376/445 |
| 3,967,847 | 7/1976 | Ellis | 294/116 |
| 3,981,673 | 9/1976 | Sokolow | 294/116 |
| 4,434,092 | 2/1984 | Mary | 252/626 |
| 4,482,520 | 11/1984 | Randazza | 376/261 |
| 4,511,499 | 4/1985 | Meuschke et al. | 252/626 |
| 4,575,930 | 3/1986 | Blickenderfer | 376/261 |
| 4,590,671 | 5/1986 | Havoic-Conroy | 376/260 |

FOREIGN PATENT DOCUMENTS

| | | | |
|---|---|---|---|
| 0047422 | 3/1982 | European Pat. Off. | 376/260 |
| 2730723 | 7/1976 | Fed. Rep. of Germany | 252/626 |

*Primary Examiner*—Deborah L. Kyle
*Assistant Examiner*—Daniel Wasil
*Attorney, Agent, or Firm*—Volker R. Ulbrich; Kenneth R. Schaefer; Kenneth Watov

[57] ABSTRACT

Apparatus for removing irradiated clips from an irradiated fuel assembly comprises a remotely operated tool including hydraulic or pneumatic jaws operable for withdrawing a clip from fuel rods, while supporting the portions of the fuel rods both above and below the clip to avoid damaging the rods during removal of a clip, and further including a support tube held captive in a carriage mechanism for moving the tool into positions for either clip removal, or for ejection of a removed clip from the tool into a clip disposal basket.

17 Claims, 24 Drawing Figures

REMOTELY CONTROLLED APPARATUS FOR REMOVING CLIPS FROM IRRADIATED NUCLEAR FUEL ASSEMBLIES

FIELD OF THE INVENTION

The field of the present invention relates generally to remotely controlled apparatus, and more specifically to such apparatus for removing clips from fuel rods of irradiated nuclear fuel assemblies.

BACKGROUND OF THE INVENTION

Nuclear reactors of the pressurized water type are susceptible to vibrational damage to the fuel rods of the associated nuclear core due to a "baffle jetting" effect from the flow of water through the fuel rod assembly. The resultant vibrational damage to either or both of the fuel rods and the associated nuclear fuel assembly is known as "fretting". In order to substantially reduce such damage from "fretting", a plurality of clips are used to secure together a number of fuel rods in each fuel assembly to the reactor core to substantially eliminate vibration of the rods due to the baffle jet effect of the water flow in the core. Clips designed to accomplish this result are taught in copending application U.S. Ser. No. 487,907, for "Apparatus For Preventing Vibrational Damage to Nuclear Fuel Rods", filed Apr. 25, 1983, and assigned to the assignee of the present invention. The teachings of this copending application are incorporated herein by reference. Prior to exposure a nuclear fuel assembly to a neutron source, the assembly is substantially safe to handle, permitting assembly workers to manually install the anti-baffle jetting or anti-vibration clips onto the fuel rods at appropriate locations on the fuel assembly. However, once the nuclear fuel assembly is installed into a reactor core and exposed to a neutron source, the fuel assembly becomes hightly radioactive, preventing any possibility of an operator coming into close contact with the irradiated fuel assembly to remove the clips, when necessary. In a typical application, the nuclear fuel assemblies arranged in peripheral locations in the core require the use of the clips to prevent vibrational damage, whereas the fuel assemblies in the interior portions of the nuclear reactor core do not require such clips, for they are not exposed to baffle jetting and the resultant fretting or vibrational wear. Fresh fuel assemblies are usually placed around the periphery of the core assembly. As the fuel assemblies age, they are moved to the interior portions of the reactor core, and spent fuel assemblies of the reactor core are removed from their interior locations. since the interior located fuel assemblies of the core cannot as readily dissipate heat relative to the fuel assemblies located around peripheral portions of the reactor core, it is desireable that the clips be removed from fuel assemblies before installation in interior locations of the core, in order to avoid hot spots in the fuel assemblies. Accordingly, it became necessary to develop apparatus for permitting a remotely located operator to remove the clips from an irradiated fuel assembly prior to placing the fuel assembly into an interior location in the reactor core. It was also recognized that such apparatus must permit rapid removal of the clips in order to avoid any lengthy shutdown of the nuclear reactor. The present invention comprises such apparatus.

SUMMARY OF THE INVENTION

The present invention comprises remotely controlled apparatus for removing fuel rod clips previously installed on peripherally located fuel rod bundles or assemblies of a nuclear reactor core, to protect the fuel rods of the bundles from vibrational or fretting damage due to baffle jetting. Typically, after about one year of irradiation of such bundles, the bundles are removed from the reactor core to an area within a water tank proximate the location of the subject apparatus. The appratus is operated via a closed circuit TV system for manipulating an associated tool to individually remove the fuel rod clips from the bundle. The tool includes means to permit the operator to manually position hydraulically actuated jaw means opposite a fuel rod clip to be removed. The jaws are then activated for removing the clip, with the tool further providing means for supporting the fuel rods associated with the clip being removed to prevent damage to the fuel rods as the clip is pulled away from engagement with the rods. After the clip is pulled free of the fuel rods, the tool is operated to place the jaw means within a clip disposal basket, whereafter the jaw means are operated to eject the clip into the basket. The tool also includes mirror means that are remotely operable for providing the operator with a desired field of view of the operating area of the tool.

BRIEF DESCRIPTION OF THE DRAWINGS

In the drawings, wherein like elements are indicated by the same reference number.

DETAILED DESCRIPTION OF THE PREFERRED EMBODIMENT

Figure 1:
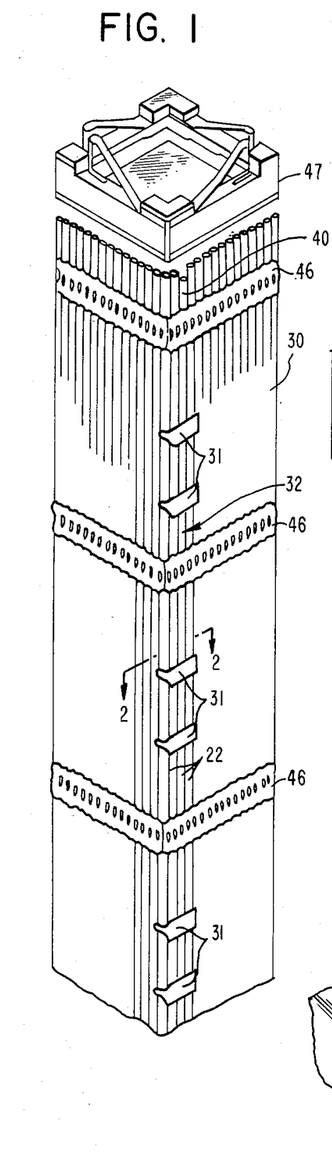
FIG. 1 is a partial pictorial view of a typical fuel rod assembly of a nuclear reactor, showing a number of the anti-vibrational clips installed at various locations on the assembly.

With reference to FIG. 1, a typical fuel rod assembly 30 includes fuel rods 22, a plurality of fuel rod spacers 46, and a top cap 47. A number of anti-baffle jetting or anti-fretting clips 31 are shown installed at various positions on the rods 22 of the fuel assembly 30 for substantially preventing fretting or vibrational damage to the rods 22.

Figure 2:
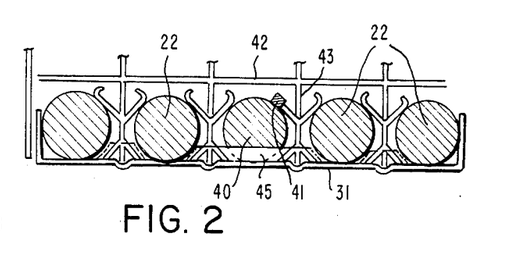
FIG. 2 is an enlarged plan or top view of one of the clips of FIG. 1, viewed along section lines 2—2 for showing the attachment of a typical clip to a number of juxtaposed fuel rods of the assembly.
Figure 3:
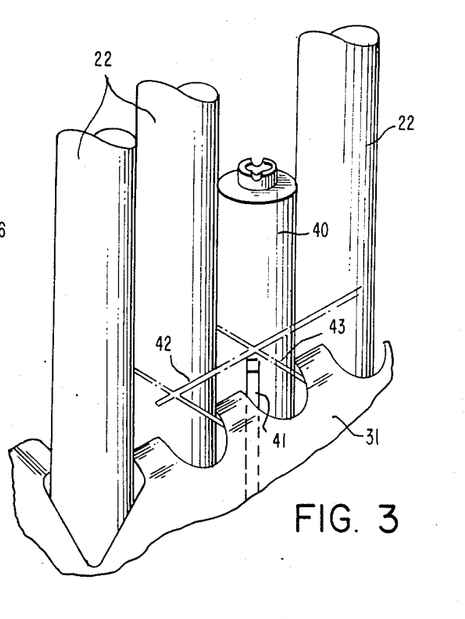
FIG. 3 is an enlarged cutaway perspective view of a section of the fuel rod assembly of FIG. 1.

FIG. 2 is a cross-sectioanl view along lines 2—2 of fuel assembly 30, showing a top view of a clip 31 securing together a number of fuel rods 22, and an inert rod 40. The inert rod 40 is shown with a tab 41 welded along its length, which tab 41 abutts the fuel assembly or fuel rod spacers 42 and 43. FIG. 3 is a close-up pictorial view of an enlarged portion of a clip 31 as installed to secure a number of fuel rods 22 and inert rod 40 together. For greater detail of the use and design of the clips 31, reference is made to previously mentioned co-pending U.S. Ser. No. 487,907, filed Apr. 25, 1983, and assigned to the same assignee as the present invention.

Figure 4:
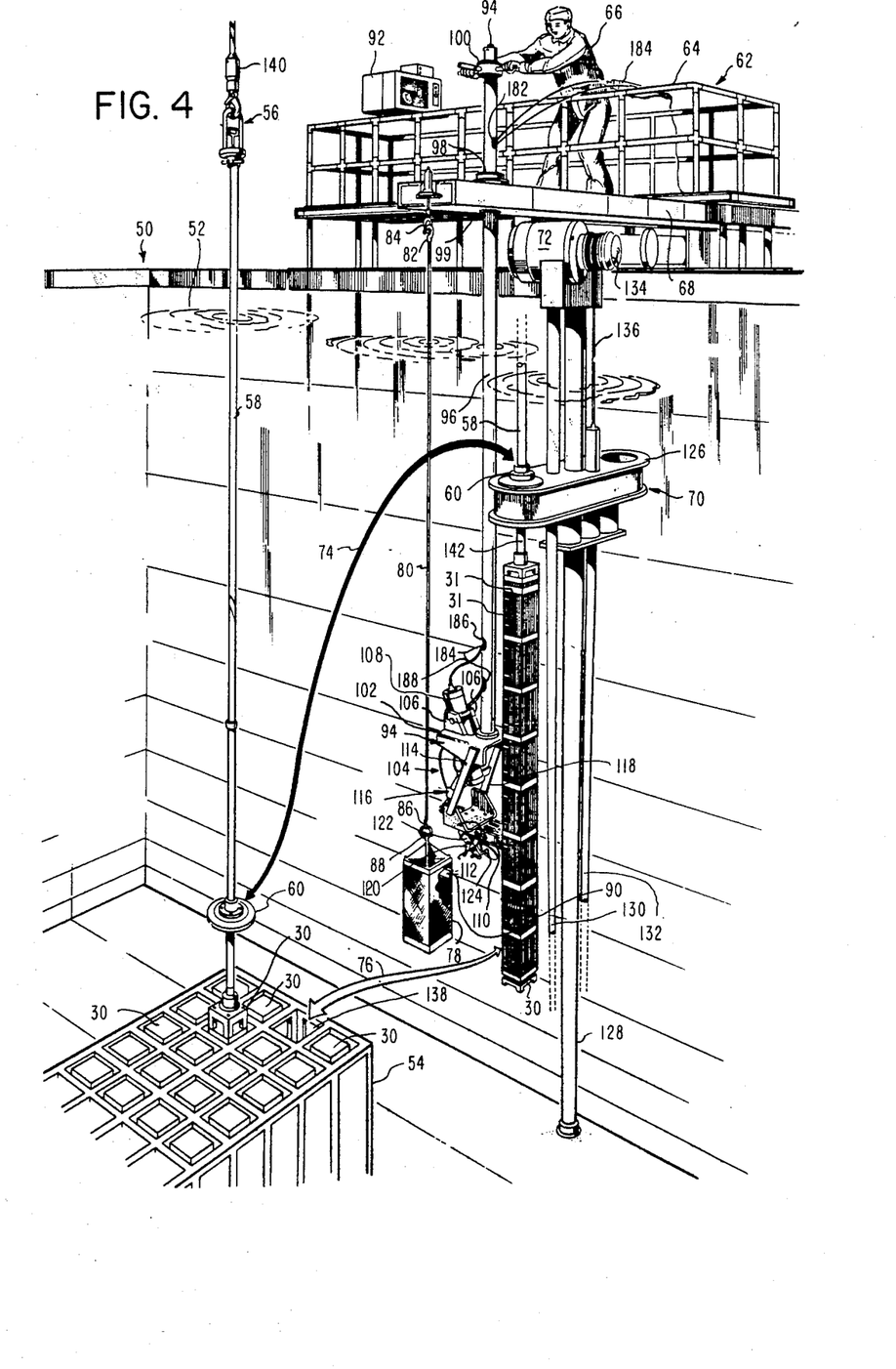
FIG. 4 is a pictorial view of a typical installation and use of the present invention.
Figure 5A:
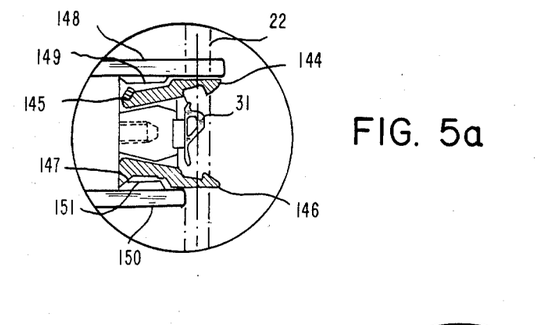
FIGS. 5A through 5D shows successive views of cutaway portions of a jaw assembly of the subject apparatus in various states of operation for removing a clip from a fuel assembly.
Figure 5B:
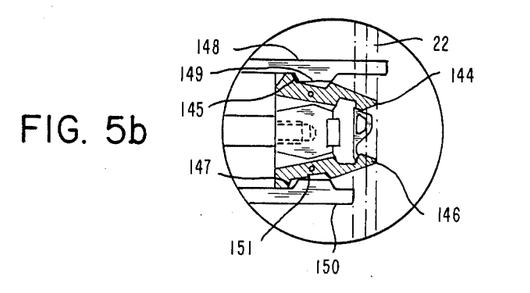
Figure 5C:
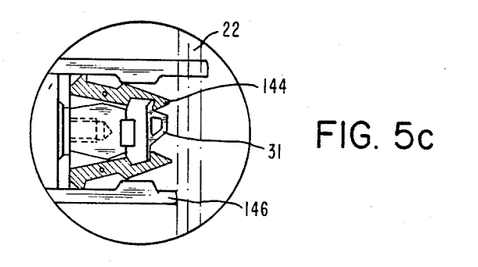
Figure 5D:
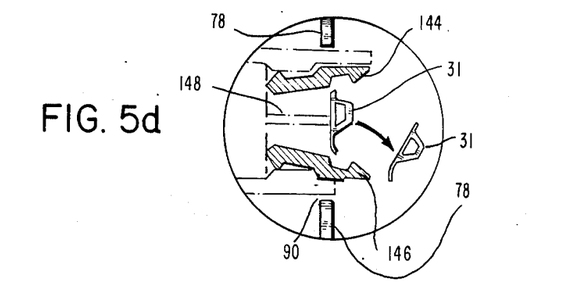
Figure 6:
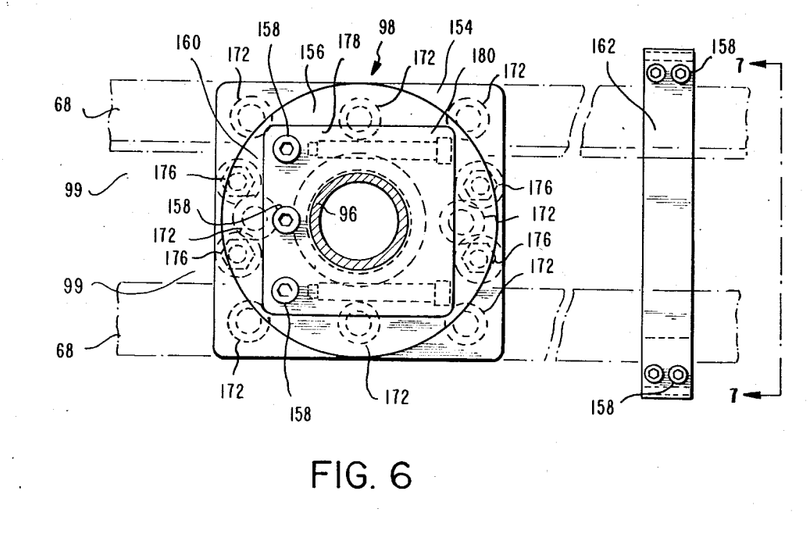
FIG. 6 is a plan or top view of the carriage assembly of the present apparatus.
Figure 7:
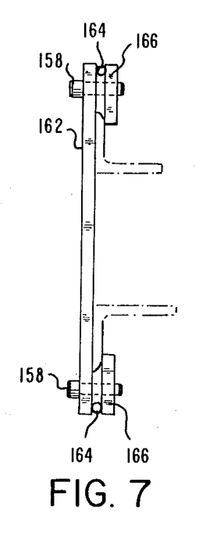
FIG. 7 is a cross-sectional view along line 7—7 showing the mounting of the carriage travel control bar across the slotway of the operator support bracket of the present apparatus.
Figure 8:
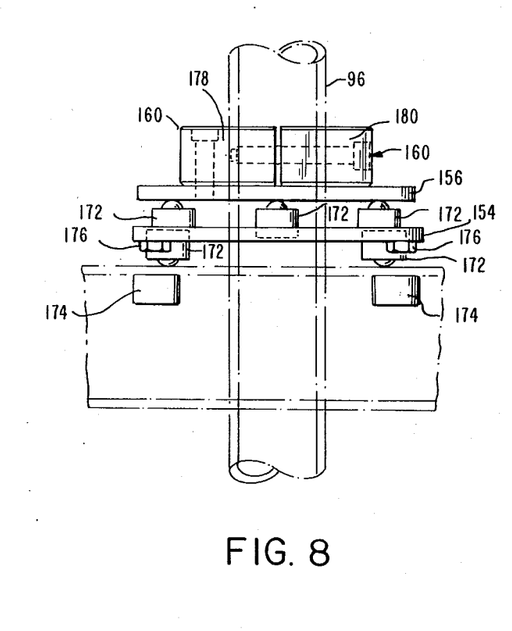
FIG. 8 is a side elevation view of the carriage assembly of the present invention.
Figures 9, 10:
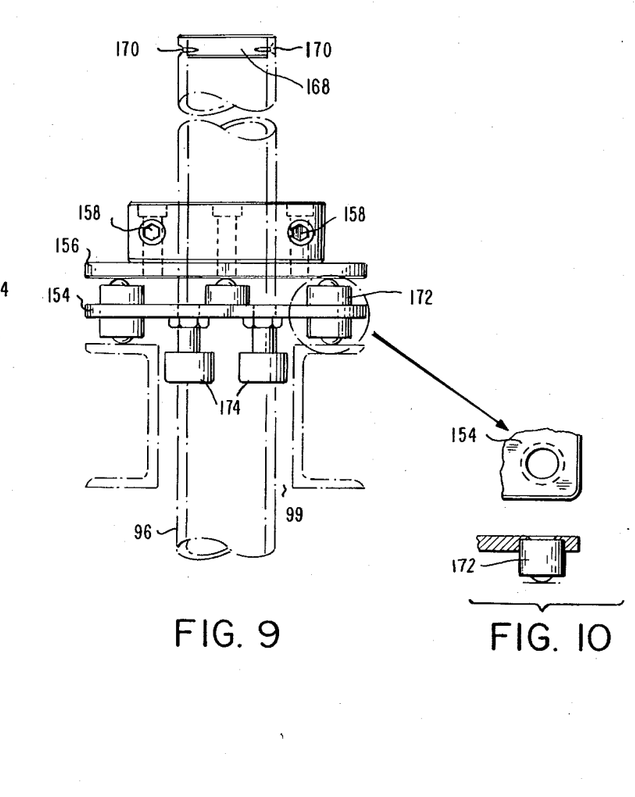
FIG. 9 is an end elevation view of the carriage assembly of the present invention.
FIG. 10 shows a view of a typical ball transfer assembly as used in the carriage assembly of the subject apparatus.

In the typical nuclear electrical generating power station a large tank of water is utilized to enclose spent or irradiated nuclear fuel rod assemblies. Such an installation is shown in FIG. 4, and includes a pictorial of the apparatus of the subject invention. As shown, a deep tank 50 is substantially filled with water 52, for safely storing a number of irradiated fuel assemblies 30 in a spent or irradiated fuel assembly rack 54 located in the bottom of tank 50. A long grapple 56 extending from an overhead crane (not shown), is shown connected via a grapple rod 58 and grapple stop plate assembly 60 to one of the fuel rod assemblies 30 partially inserted in a cell 138 of the fuel rack 54. The combination of the overhead crane and long grapple 56 is operable for moving fuel assemblies 30 about the tank 50, and either into or out of the spent fuel rack 54. A working platform 62 is mounted above the tank 50 and protrudes partly over the water 52. A safety railing 64 surrounds the perimeter of the working platform 62 to help prevent an operator 66 from falling off the platform 62. An operator and tool support bracket is formed by a beam 68 secured to the working platform 62. The beam 68 has a cantilever portion projecting from the working platform 62 over the water 52 of the tank 50 as shown. A "fresh fuel elevator assembly" 70 is mounted in the tank as shown, and includes a motor 72 rigidly held above the surface of the water 52, as shown. As shown by the arrow path 74, the long grapple 56 is used for moving fuel assemblies 30 between the fuel rack 54 and the fresh fuel elevator 70. An irradiated fuel assembly 30, as depicted by the arrow 76 is shown just after being moved from the fuel rack 54 to mounting upon the fresh fuel elevator assembly 70. Clips 31 must be removed from this fuel assembly 30.

The present apparatus for permitting the removal of clips 31 from a fuel assembly 30 includes the operator support bracket 68, a disposal basket 78 suspended by a cable 80 having a hook 82 at one end for coupling to an eyelet 84 rigidly connected to the end of the cantilever beam comprising the operator support bracket 68. The other end of the cable 80 is secured to another hook 86 for coupling to a suspension ring 88 secured to the clip disposal basket 78. The disposal basket 78 also includes an access window 90 for receiving clips 31 removed from fuel assembly 30. A television monitor 92 is secured to the top of the railing 62 in an appropriate position for viewing by an operator 66 positioned as shown. The operator 66 is shown in the act of positioning a clip removal tool assembly 94.

The clip removal tool assembly 94 includes a tool support pole or tubing 96 secured at an upper portion thereof to a carriage assembly 98, thereby establishing the height of the tubing 96 protruding above the operator support bracket 68, and corresponding the length of the tubing 96 protruding below the operator support bracket 68 to a predetermined depth (about 40 feet, for example) within the water 52 of tank 50. A spoked wheel 100 is rigidly connected to an uppermost portion of the tubing 96. The lowermost end of the support tubing 96 is rigidly connected to the top of a frame 102 of a clip removal tool 104, thereby establishing the location of the clip removal tool 104 at a predetermined depth and area within tank 50. As shown, the frame 102 includes upright brackets 106 for rigidly mounting a television camera 108 at a predetermined angle in the tool 104 for viewing the operating area of a jaw assembly 110.

The jaw assembly 110 is rigidly mounted to the bottom of a generally U-shaped frame 112. The frame 112 is rigidly attached to the upper frame 102 via rigid mounting straps 114, as shown. A portion of a hydraulic cylinder 116 is shown mounted between the rear of the jaw assembly 110 and a cross bracket 118 rigidly mounted between the inside faces of the mounting straps 114. Also shown is a right-hand portion of a mirror system 120, which includes an air or hydraulic cylinder 122 mounted to a bottom surface of a jaw assembly 110 for providing selective positioning of the right-hand mirror 124. An identical mirror system is included on the left-hand side of the jaw assembly 110, but is not shown in the view given in FIG. 4. Note that the fresh fuel elevator 70, although not part of the present apparatus, is used in conjunction with the operation of the present apparatus in order to accomplish the removal of the clips.

The fresh fuel elevator 70 includes a carrier 126 which is moved up and down along a central post 128, and two guide posts 130 and 132, as shown. The motor 72 is used to rotate a pulley 134 for winding and unwinding a cable 136 attached to the carrier 126 for positioning the carrier 126 at a desired vertical location in the tank. As previously mentioned, the fresh fuel elevator 70 is typically for use in facilitating handling of fuel assemblies 30 within the water tank 50.

With reference to FIGS. 4 and 5, a general description of the operation of the present apparatus will now be given. Typically, an irradiated fuel assembly 30 is stored in the spent fuel rack 54 until such time it si to be either disposed of or installed in a reactor core. An irradiated fuel assembly 30 removed from a peripheral location in a reactor core (not shown), may be temporarily stored in the spent fuel rack 54 until such time that the clips 31 are to be removed therefrom, for permitting the irradiated fuel bundle 30 to be restrained in an interior location of the reactor core. Assume that as shown in FIG. 4, the grapple 56, shown attached at an upper end to the hook and cable assembly 140 of an overhead crane (not shown), and connected at its other end to an irradiated fuel assembly 30 previously stored in a cell 138 of fuel rack 54, was operated to lift the fuel assembly from the fuel rack 54 to a position in the fresh fuel elevator carrier 126 (see arrow 76) as shown. The grapple stop plate 60 serves to hold the fuel assembly 30 in place in carrier 126 via the coupling rod 142. The fuel assembly 30 was previously dropped through a hole in the carrier now covered by the grapple stop plate 60 until the stop plate 60 seats on the carrier plate 126 with the fuel assembly 30 appropriately oriented to the clip removal tool assembly 104, for removal of certain ones of the clips 31 from the assembly 30. By observing the positioning of the jaw assembly 110 to the fuel assembly 30, the operator 66 first operates the fresh fuel elevator 70 controls (not shown) to position a clip 31 to be removed in the same horizontal plane as the jaw assembly 110. The operator 66 next proceeds to grasp the spoked wheel 100 to both turn the spoked wheel 100 and push the carriage assembly 98 forward and backwards as required along a slot 99 in the operator support bracket 68, for positioning the jaws 110 immediately opposite and typically within an inch of the clip 31 to be removed. This is accomplished by observing the view of the area about the jaw assembly 110 on the television monitor 92, and also by operating the appropriate controls (not shown) for operating the mirror system 120 (and the mirro system on the opposite side of the jaw assembly 110) to obtainthe best view of the area about the jaw assembly 110. The operator 66 next pushes the spoked wheel 100 in a direction away from the fuel assembly 30, thereby causing the carriage assembly 98 and tubing 96 to "tilt" in a direction forcing the jaw assembly 110 into contact with portions of fuel rods 22. When properly positioned, the upper and lower jaws 144, 146, respectively, are in the open position about a clip 31 as shown in FIG. 5A. As will be described in greater detail later, as also shown in the view, an upper support plate 148, and a lower support plate 150, are abutted against portions of the fuel rods 22 (shown in phantom in view A of FIG. 5) above and below the clip 31 to be removed. The hydraulic actuator 116 is then operated for causing the jaws 144 and 146 to close on the top and bottom edges of the clip 31, as shown in FIG. 5B. Continued operation of the hydraulic actuator 116 causes the jaws 144 and 146 to move away from the fuel rods 22, thereby pulling the clip 31 away from engagement with the fuel rods 22, as shown in FIG. 5C. The operator 66 next proceeds to pull the spoked wheel 100 toward the fuel assembly to "tilt" the jaw assembly 110 away from the fuel assembly 30. The spoked wheel 100 is then turned in a clockwise direction, in this example, to position the front of the jaw assembly 110 within the window 90 of the disposal basket 78. The last step in the quick removal operation, is for the operator 66 to reverse the previous operation of the hydraulic actuator 116 for moving the jaws 144 and 146 forward towards the front of the jaw assembly 110 to their open position, as shown in FIG. 5D. The operator 66 next operates a pair of ejector cylinders (to be described later) for causing a pair of ejector plungers 148 (shown in phanthom in FIG. 5D) to move forward for pushing the clip 31 out of the jaw assembly 110 and into the basket 78. the next clip 31 to be removed from the fuel assembly 30 is so removed by repeating the previously described sequence of operation, including operation of the fresh fuel elevator 70, if necessary. Note that as the jaws 144, 146 are moved back and forth between the upper and lower support plates 148,150, cam-like surfaces 145 and 147 of jaws 144,146, respectively, interact with cam surfaces 149 and 150 on the inside faces of the upper and lower support plates 148,150, respectively, for opening and closing the jaws 144,146, as shown.

Details of the carriage assembly 98 will now be described with reference to FIGS. 6 through 10. The carriage assembly 98 includes a base plate 154, an upper plate 156, cap screws 158, tube clamp 160, carriage travel control bar 162, pivot bar spacers 164, clamping plates 166, a tube protection cap 168, machine screws 170, auto track ball transfers 172 tack welded in place, bearings 174, and jam nuts 176. These components are assembled as shown in FIGS. 6 through 10. Note that two carriage control bars 162 may be secured on either side of the base plate 154 across the slotway 99 in order to limit the movement of the carriage assembly 98 in the forward and backward positional extremes. The support tubing 96 is rigidly secured at an appropriate portion thereof, via the tubing clamp 160. As shown, the tubing clamp 160 includes two halves 178 and 180. The half tubing clamp portion 178 includes a pair of threaded holes for receiving cap screws 158 inserted in holes in the other half portion 180, for securing the tubing clamp 160 to the tubing 96, as shown.

Figure 11:
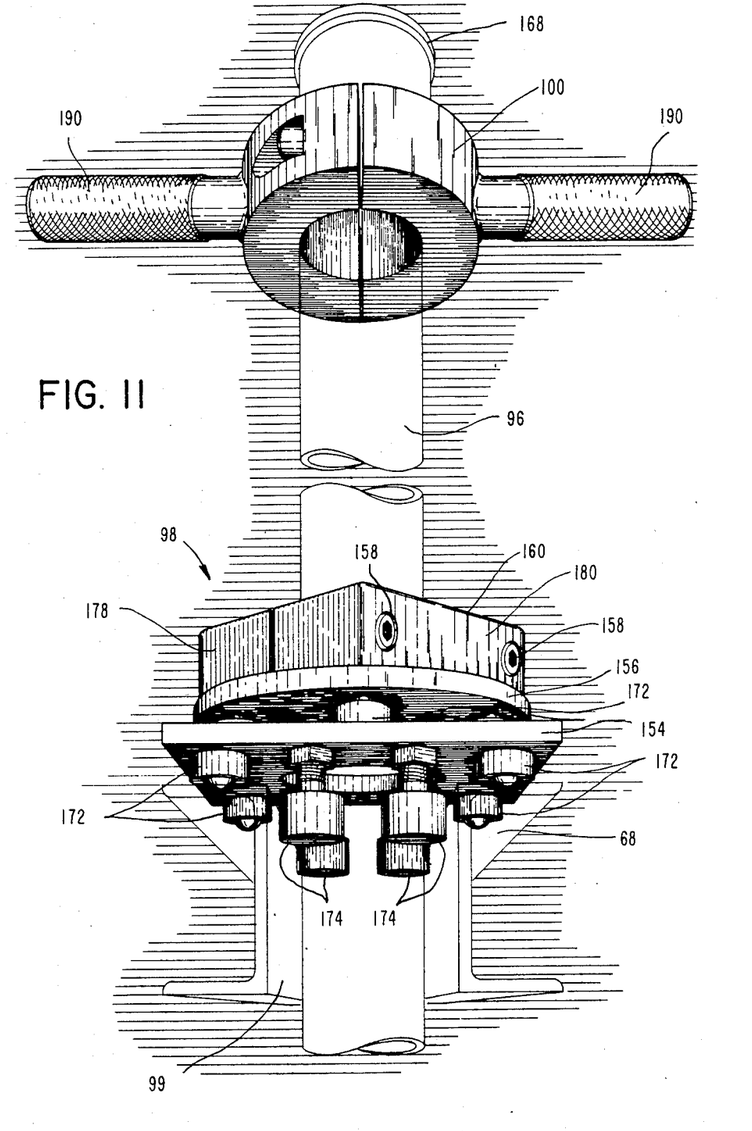
FIG. 11 is a partial ghost pictorial view showing a manual control handle or spiked wheel coupled to the tool support pole and carriage assembly all of the present apparatus.
Figure 12:
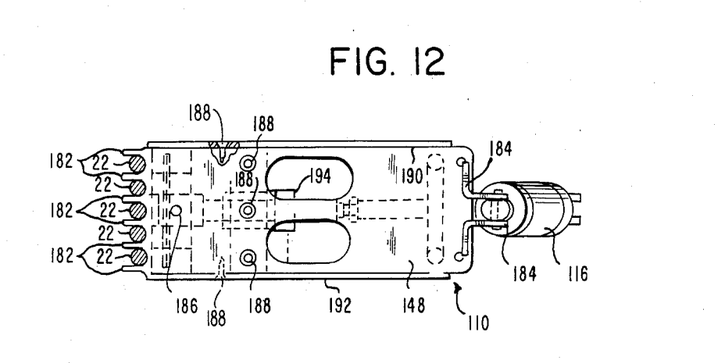
FIG. 12 is a plan or top view of the clip removal tool assembly of the present apparatus.

As shown in FIG. 4, a hole 182 is provided in the upper portion of the tubing 96 near the working platform 62 for receiving control cables 184 (note that the cables include electrical wires and hydraulic or pressurized air lines) for connection to the TV camera 108, the hydraulic actuator 116, and the mirror systems including system 120. A pictorial view of the carriage mechanism 98 is shown in FIG. 11, and also includes a pictorial view of a typical spoked wheel 100 connected to tubing 96 shown in ghost or phantom view. In this example, the spoked wheel 100 is shown to include two sections which are clamped about tubing 96, and also shown protruding from each half section of the spoked wheel 100 are spokes or handles 190. By turning the spoked wheel 100 clockwise or counterclockwise the tubing 96 is easily rotated via the corresponding rotation of the upper carriage plate 156 upon the ball-like bearings 172 mounted on the top of the carriage base plate 154. Also, by either pushing or pulling on the handles 190, the tubing 96 is easily moved forward or backwards within a range along the slotway 99 in the operator support bracket 68, via the interaction between the ball-like bearings 172 on the bottom of the carriage base plate 154 rolling along the top surface of the operator support bracket 68, and the interaction between the roller-like bearings 174 rolling along the inside faces of the operator support bracket 68.

Figure 13:
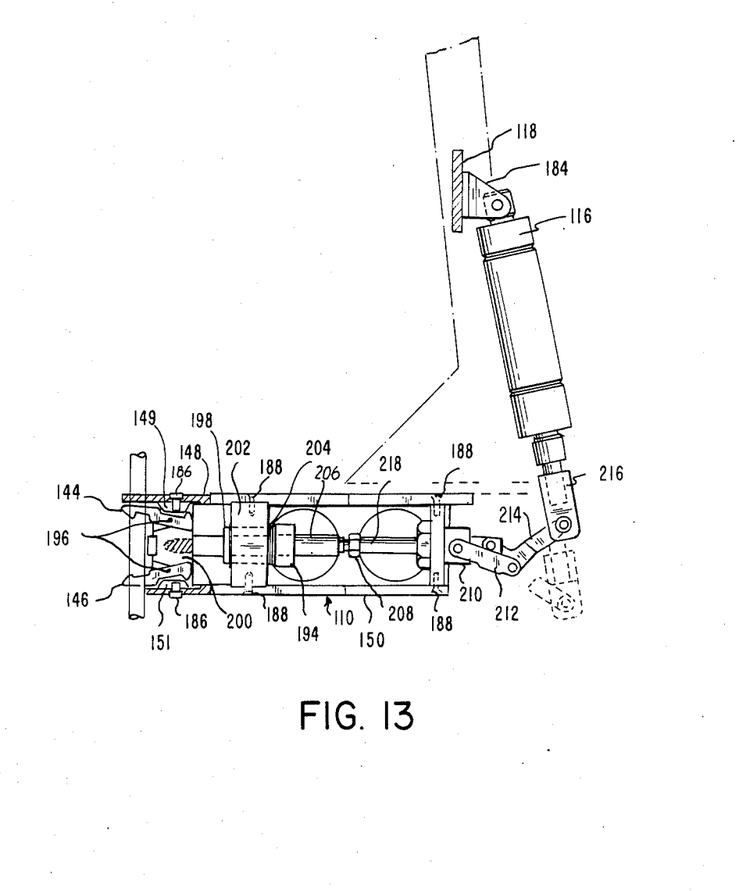
FIG. 13 is an elevation view of the clip removal tool assembly with the left hand cover plate removed.
Figure 14:
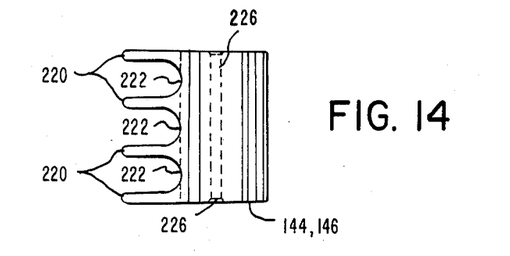
FIG. 14 is a plan or top view of a clip removal jaw of the present apparatus.
Figure 15:
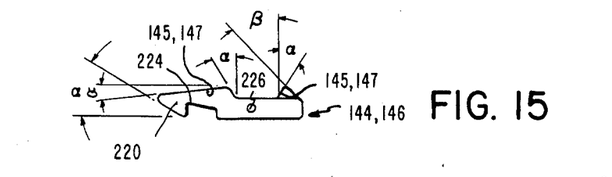
FIG. 15 is an elevation view of the jaw of FIG. 14.

Design details of the jaw assembly 110 follow with reference to FIGS. 12 through 15. As shown, the jaw assembly 110 includes an upper support plate 148 having finger-like projections 182 along the width of its front or leading edge for engaging juxtaposed fuel rods 22 (five in this example) about portions of the fuel rods 22 above a clip 31 to be removed (see FIG. 12), thereby supporting the fuel rods 22 above a clip 31 to be removed. Further included are a pivot bracket 184 for connecting hydraulic or air cylinder 116 to the cross bracket 118, cap screw 186, machine screws 188, a right-hand side plate 190, a left-hand side plate 192, a set collar 194, an upper support plate 148, a jaw actuator cam 149, a lower support plate 150, a jaw actuator cam 151, an upper clip removal jaw 144, a lower clip removal jaw 146, jaw support pins 196, a ball bushing 198, a jaw support block 200, a linear bearing support block 202, a retaining ring 204, an actuator shaft 206, a hex nut 208, an actuator handle 210, a straight linkage 212, a bent linkage 214, a plunger 216 of cylinder 116 and secondary actuator shaft 218, all assembled as shown. As shown in FIGS. 14 and 15, the clip removal jaws 144 and 146 are identical. The jaws 144 and 146 include finger-like projections 220 (four such fingers 220 are shown in this example), with semi-circular cutouts 222 provided between the fingers 220 for permitting the fingers 220 to slip between three juxtaposed fuel rods 222 to a depth where the notches 224 of each finger 220 can be placed over an edge of a clip 31 to be removed from a fuel assembly 30. As previously described, the jaws 144, 146 include identical cam surfaces 145 and 147, contoured in this example to have angles alpha ($\alpha$) of 30°, beta ($\beta$) of 45°, gamma ($\gamma$) of 7°, and rho ($\rho$) of 10° (the latter angle being associated with the notch 224). A hole 226 is provided for receiving pins 196 for pinning the jaws 144, 146 to the jaw support block 200 (see FIG. 20).

Figure 16:
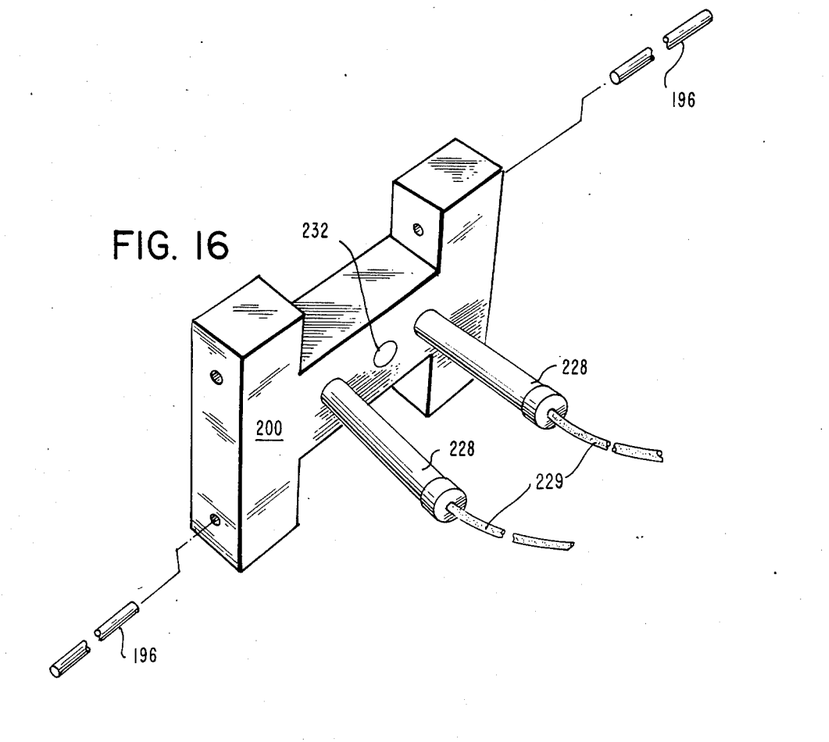
FIG. 16 is a pictorial view from the rear of the jaw support block of the clip removal tool assembly of the present apparatus showing a pair of ejector cylinders mounted on the jaw support block.
Figure 21:
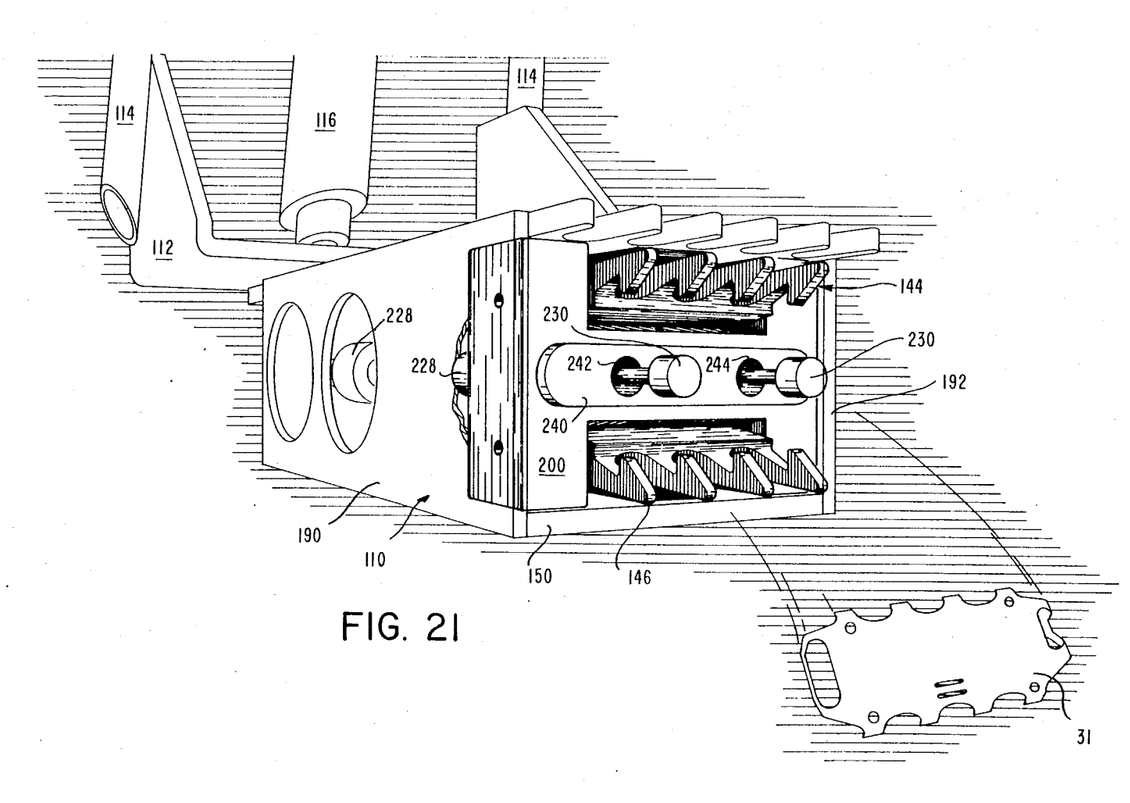
FIG. 21 shows a portion of the clip removal tool in a ghost or phantom-like pictorial shortly after operating the clip removal tool for opening its jaws and operating its pair of ejection cylinders for ejecting a clip from the tool assembly.

In FIG. 16, a pictorial view is shown of the jaw support block 200. Mounted on the back or rear face of the jaw support block 200 are two relatively small air cylinders 228, in this example screwed into threaded holes of the former. As will be later described in more detail, actuation of the cylinders 228 causes respective plungers to rapidy move outward from the front face of the jaw block 200 for pushing a clip 31 out of the jaw assembly 110 (see FIG. 21). The jaw block 200 also includes a threaded hole 232 for receiving the threaded end of the actuator shaft 206 (see FIG. 13).

Figure 17:
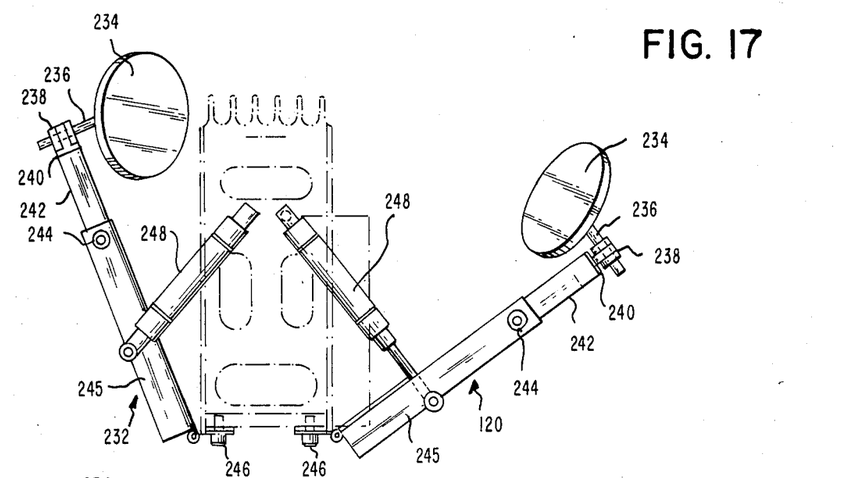
FIG. 17 is a plan or top view of the clip removal tool showing the mounting of the left hand and right hand mirror support arm assemblies mounted thereupon.
Figure 18:
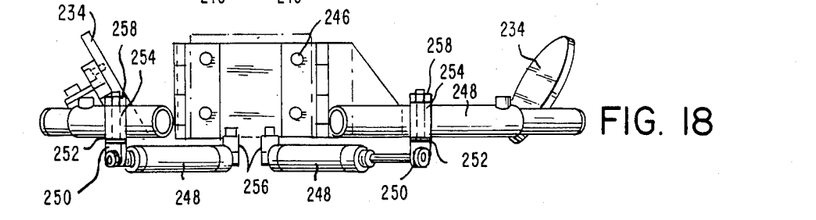
FIG. 18 is a rear elevation view of the clip removal tool showing the clip removal tool mirror system assembly.
Figure 19:
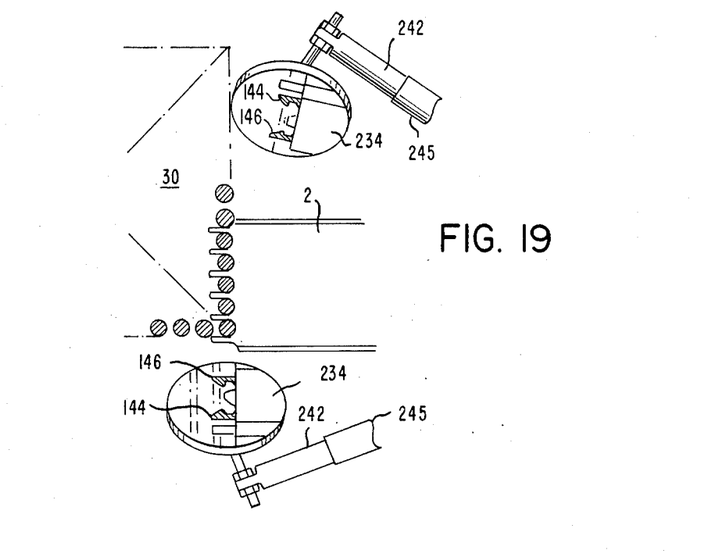
FIG. 19 shows the typical field of view obtained by the television camera mounted upon the frame of the clip removal tool of the present apparatus.

Details of the right and left-hand mirror assemblies 120, 232, respectively, are shown in FIGS. 17 and 18. As shown, the mirror assemblies 120 and 232 are identical, and each include in this example a circular mirror 234, a mirror extension bolt 236, a hex lock nut 238, a support arm end fitting 240, a mirror support arm extension 242, Allan Head set screws 244, cap screws 246, hydraulic or pneumatic activator cylinders 248, connecting bolts 250, flat washers 252, swivel busings 254, pivot bolts 256, and lock nuts 258, assembled as showm. Individual actuation of either one of the actuator cylinders 248 permit an operator 66 to change the angular orientation of either of the mirrors 234 relative to the front of the jaw assembly 110, for changing the field of view reflected from the mirrors 234 to the television camera 108. FIG. 19 shows a typical field of view as viewed from the television monitor 92 (the field of view shown is that actually viewed from the camera 108).

Figure 20:
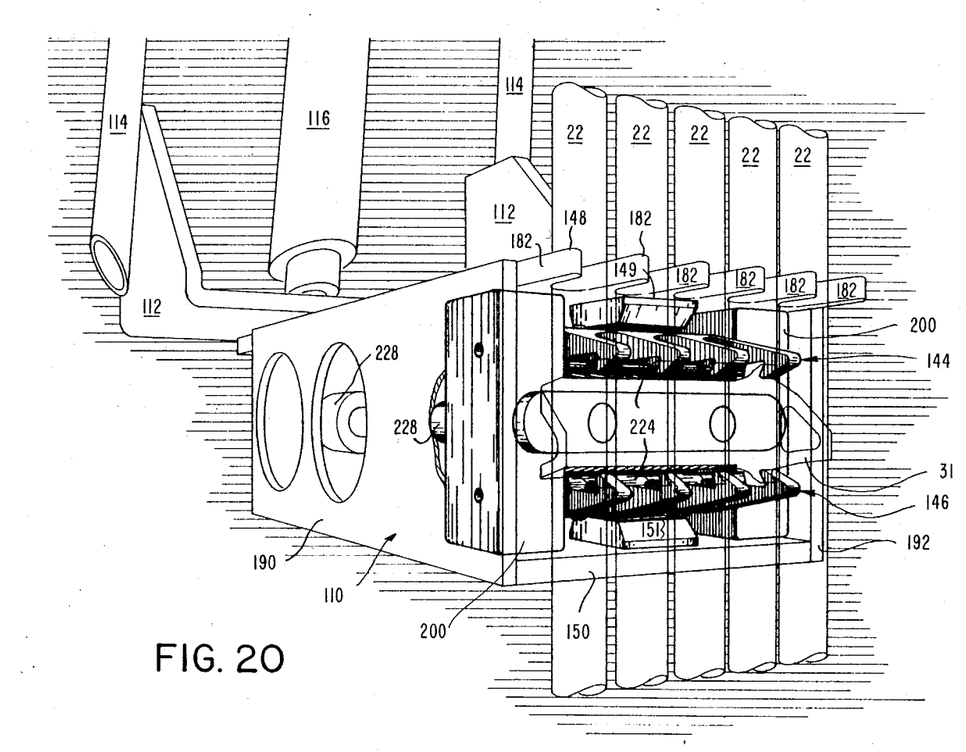
FIG. 20 is a partial ghost or phantom pictorial view of a portion of the clip removal tool positioned with its jaw closed upon a clip to be removed from a fuel rod assembly.

A more detailed description of the operation of the present invention, particularly the jaw assembly 110, will now be given with reference to FIGS. 4, 13, and 20, for removing a clip 31 from a fuel assembly 30. The operator 66, as previously described, operates the fuel elevator 70, in conjunction with turning, pushing and pulling the spoked wheel 100 and moving the carriage assembly 98 forward or backward, as required, to position the tool 104 with its jaw assembly 110 positioned about a clip 31 as shown in FIG. 20. As shown in FIG. 20, the jaws 144 and 146 are open with their notches 224 immediately over the top and bottom edges of the clip 31. The fingers 182 of the upper support plate 148 support the fuel rods 2 at portions above the clip 31, whereas the leading edge of the lower support plate 150 supports the fuel rods 22 below the clip 31 to be removed. The operator 66 may periodically activate either or both of the cylinders 248 for repositioning the mirrors 234 for improving his view of the area about the clip 31 to be removed. With the jaws 144 and 146 in the open position, the actuator cylinder 116 has its plunger 216 positioned as shown in FIG. 13, whereby the actuator shaft is positioning the jaw support block 20 in its forwardmost position, where the interaction between the jaws 144 and 146, with the cams 149 and 151, respectively, holding the jaws 144, 146 in their open position. The operator 66 next activates the cylinder 116 for causing the plunger 216 thereof to move towards the positions shown in phantom in FIG. 13, causing the jaw block 200 to move rearward, whereby the interaction between the jaws 144 and 146, and cams 149 and 151, respectively, causes the jaws 144, 146 to very rapidly close for tightly grasping the top and bottom dges of the clip 31 in the jaw notches 224 (occurs upon only slight rearward movement of the jaw block 200). As the plunger 216 continues to move toward the phantom position shown in FIG. 13, the jaw block 200 continues to move rearward pulling the clip 31 away from the fuel assembly 30, whereby when the plunger 216 reaches the phantom position of FIG. 13, the clip 31 will be completely removed from the fuel assembly 30.

Once a clip has been removed from a fuel assembly 30, the operator 66 must next proceed to deposit the removed clip 31 into the disposal basket 78 (see FIG. 4). To accomplish this, the operator 66 observes the TV monitor 92 and manipulates the spoked wheel 100 for positioning the front of the jaw assembly 110 into the window 90 of disposal basket 78. The operator 66 then activates the activator cylinder 116 for moving the jaw support block 200 forward to cause the jaws 144 and 146 to open. Next, the ejector cylinders 228 are activated for causing their respective plungers 230 to move rapidly outward from holes 242 and 244 within a recess 240 of the jaw block 200 (see FIG. 21), causing the removed clip 31 to be ejected into the disposal basket 78. In this manner, the apparatus of the present invention permits irradiated clips 31 to be safely removed from an irradiated fuel assembly 30.

While the present invention has been described in connection with the preferred embodiments thereof, it should be understood that there may be other obvious modifications or embodiments of the present invention which fall within the spirit and scope of the invention as defined by the appended claims.

What is claimed is:

1. In a nuclear plant facility having irradiated clips securing together a plurality of fuel rods of an irradiated nuclear fuel rod assembly contained underwater in a tank, a clip removing apparatus comprising:
   a tool having:
      a frame;
      first and second substantially parallel fuel rod support means secured to said frame for supporting portions of said fuel rods located above and below a clip to be removed;
      first and second cams on opposing faces of said first and second fuel rod support means;
      first and second jaws each having an outer surface profiled for interaction with said first and second cams, respectively;
   jaw support block means slideably located between said first and second fuel rod support means for providing opposed pivotal mounting of said first and second jaws to permit said first and second jaws to pivot between open and closed positions as said block means is moved between forwardmost and rearwardmost positions relative to said first and second fuel rod support means; and
   jaw actuator means connected between said jaw support block means and said frame, remotely operable for selectively moving said jaw support block means between forwardmost and rearwardmost positions, whereby with said tool prepositioned with a clip to be removed between said first and second fuel rod support means, and said block means in a forwardmost position, and said first and second jaws open over the top and bottom edges of said clip, respectively, said jaw actuator means is operated to move said block means rearward, causing said first and second jaws to pivot closed for grasping said clip, and thereafter pulling said clip free of said fuel assembly as said block means continues to move rearward.

2. The apparatus of claim 1, further including tool positioning means rigidly connected to said frame, for permitting an operator to remotely position said tool for removing a clip from said fuel assembly.

3. The apparatus of claim 2, further including observation means for providing at a remotely located operating station a visual image of said first the second jaws and a portion of the associated surrounding area thereto, thereby assisting said operator in using said tool positioning means and operating said tool.

4. The apparatus of claim 3, wherein said observation means includes:
   television camera means mounted upon said frame and being prepositioned for forming and transmitting video signals of said visual image to said remotely located operating station.

5. The apparatus of claim 4, wherein said observation means further includes:
   mirror means mounted upon said frame for reflecting back to said television camera means an image of areas about said first and second jaws not in the direct field of view of said television camera means.

6. The apparatus of claim 5, wherein said observation means further includes movable mounting means for mounting said mirror means to said frame, said movable mounting being remotely operable for selectively positioning said mirror means, for obtaining a desired field of view.

7. The apparatus of claim 5, wherein said mirror means includes first and second mirrors juxtaposed to said first and second jaws, respectively, for providing fields of view proximate said first and second jaws, respectively.

8. The apparatus of claim 7 said movable mounting means further includes:
   first and second movable mounting means for mounting said first and second mirrors to said frame, respectively, said first and second movable mounting means being independently remotely operable for selectively positioning said first and second mirrors, respectively, for obtaining a desired field of view.

9. The apparatus of claim 1 further including:
   an operator support platform suspended above the water in said tank; and
   tool positioning means connected to said platform and rigidly attached to the top of said frame, for permitting an operator on said platform to position said tool for removing one of said clips.

10. The apparatus of claim 9, wherein said tool positioning means further includes:
    a support pole;
    said operator support bracket including a longitudinal slotway through its top and bottom portions overlying an area of the surface of said water in said tank; and
    carriage means slideably mounted upon the slotway of said operator support bracket, said carriage means including a hole for receiving said support pole, and means for both rigidly securing a portion of said pole within said hole, and permitting rotation of said pole, whereby one end of said pole protrudes above support platform for permitting access thereto by an operator on said support platform, and the other end of said pole extends below said support bracket for rigid attachment to said frame of said tool, therebypermitting said operator to push or pull said pole in an appropriate direction for moving said tool back and forth within a range in a horizontal plane within said tank, for adjusting the distance between said tool and a fuel assembly, and for further permitting said operator to rotate said pole for rotating said tool, all for positioning said tool to remove a clip from said fuel assembly.

11. The apparatus of claim 10, wherein said tool positioning means further includes a spoked wheel rigidly secured to said one end of said support pole for permitting an operator easy manipulation of said tool positioning means.

12. The apparatus of claim 1 further including:
    clip disposal basket means suspended from said operator support bracket to a position in said tank means proximate said tool, whereby after operating said tool to remove one of said clips from said fuel assembly, said operator manipulates said tool positioning means for positioning said tool with its jaws either directly over or within an opening in said basket means, and thereafter operates said jaw actuator means of said tool for moving said jaw support block means to a forwardmost position for opening said first and second jaws for releasing the clip into said basket means.

13. The apparatus of claim 1, wherein said tool further includes:

clip ejection means remotely operable for pushing a previously retrieved clip away from said first and second jaws in an open position.

14. The apparatus of claim 13, wherein said clip ejection means includes:
   plunger means slideably mounted on said jaw support block means, between said first and second jaws, for longitudinal movement between a retracted position away from the front of said first and second jaws, and an extended position at or about the front of said jaws, said plunger means being operable to rapidly move towards the extended position for ejecting a clip from said jaws.

15. The apparatus of claim 14, wherein said plunger means includes:
   first and second ejector cylinders rigidly mounted to a back face of said jaw support block means, behind and centered upon two holes through the back face of said jaw support block means, the holes being located in a plane between said first and second jaw means, said first and second ejector cylinders being remotely operable for rapidly extending respective plungers for ejecting a clip from said jaws.

16. The apparatus of claim 4, further including:
   television monitor means located at said remotely located operating station, for receiving said video signals and converting the same to said visual image for viewing by said operator.

17. In a nuclear plant facility having irradiated clips securing a plurality of rods of a nuclear fuel assembly together, the nuclear fuel rod assembly being contained underwater in a storage tank, said storage tank including an operator platform over a portion of said tank, and a fuel elevator to move fuel assemblies to different locations in said tank, a remotely operable apparatus for removing said clips comprising:
   an operator support bracket secured to said platform and having a portion extending from said platform to a position over said water, said operator support bracket including a longitudinal slotway;
   a support pole;
   carriage means slideably mounted upon said slotway, said carriage means including a hole for receiving said support pole, and means for securing a portion of said pole within said hole, but permitting rotation of said pole whereby one end of said pole protrudes above said carriage means to a height permitting access thereto by an operator on said platform, the other end of said pole extending below said operator support bracket to a predetermined level within said tank;
   rotating means secured to said pole for permitting an operator to rotate said pole;
   tool means including a frame connected to the other end of said pole, said tool means including:
      jaw means attached to said frame, and remotely operable for grasping and removing at least one of said clips from a fuel rod assembly;
      television camera means positioned for viewing said jaw means and portion of the area surrounding said jaw means, and transmitting video signals of this view; and
      mirror means mounted upon said frame and being remotely positionable for reflecting to said television camera means on image of areas of said jaw means and the surrounding area not in the direct field of view of said television camera means;
   television monitor means mounted upon said platform and positioned in the field of view of said operator, for receiving said video signals from said television camera means, and displaying a visual image thereof to said operator; and clip disposal basket means positioned near said tool means, for receiving said irradiated clips from said tool means;
   said apparatus being operable by said operator positioning said jaw means opposite one of said clips to be removed, said positioning being accomplished by the operator observing the image on said television monitor means, and operating said fuel elevator to obtain the necessary vertical position of said fuel assembly concurrent with moving said rotating means to place said jaw means opposite said clip to be removed, and thereafter operating said jaw means to engage and remove said clip, followed by moving said rotating means to position said jaw means with said clip within said basket, and releasing said clip into said basket via operation of said jaw means to an open position.

* * * * *